April 30, 1968  G. W. MILLER  3,380,662

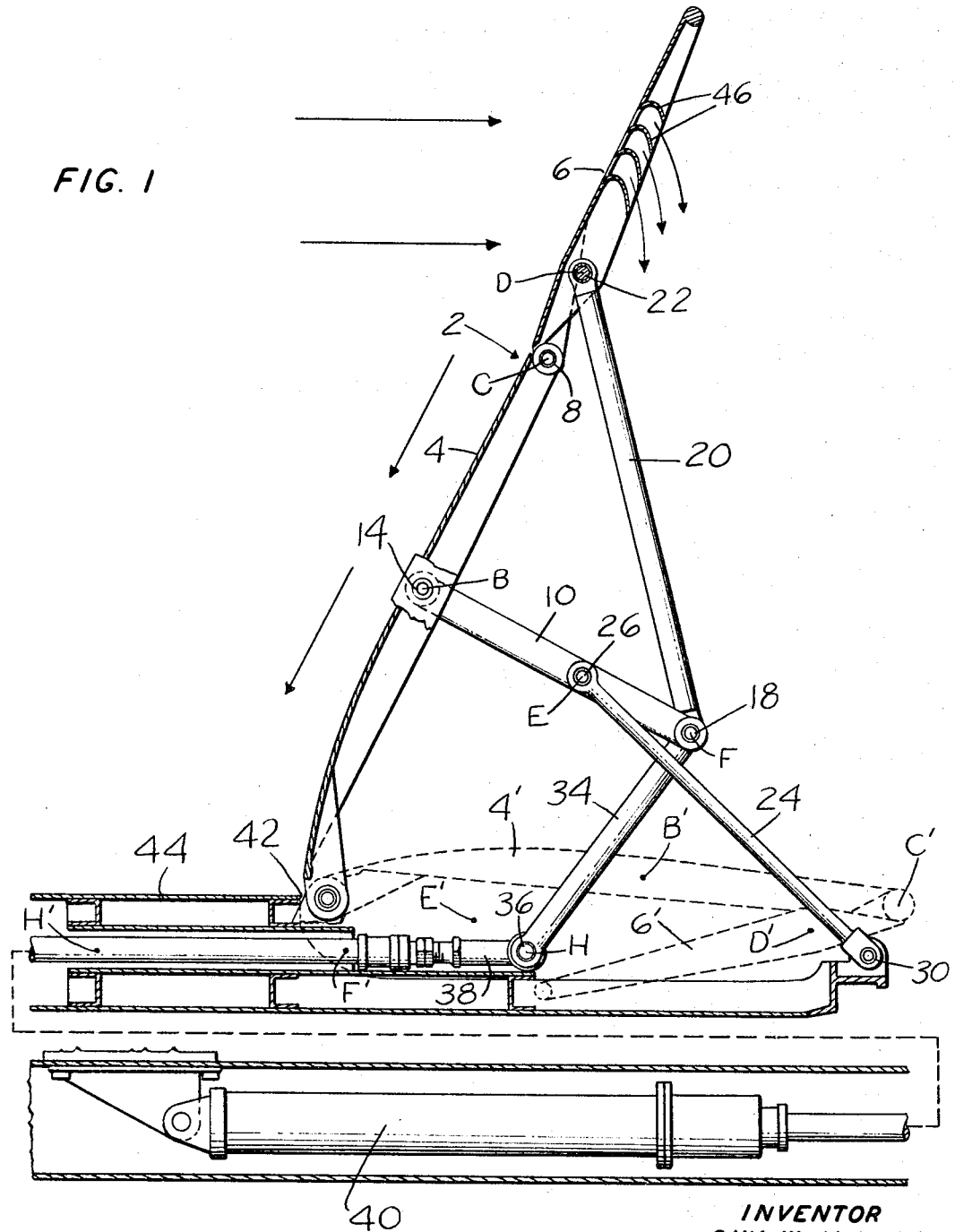

FOLDING FLAP THRUST REVERSER

Filed Dec. 29, 1965  2 Sheets-Sheet 2

INVENTOR
GUY W. MILLER

BY *Fishman & Van Kirk*
ATTORNEYS

United States Patent Office 3,380,662
Patented Apr. 30, 1968

3,380,662
FOLDING FLAP THRUST REVERSER
Guy W. Miller, Vernon, Conn., assignor to United Aircraft Corporation, East Hartford, Conn., a corporation of Delaware
Filed Dec. 29, 1965, Ser. No. 517,291
10 Claims. (Cl. 239—265.37)

ABSTRACT OF THE DISCLOSURE

A jet engine thrust reverser segmented into two pivotably connected parts. In the operating position the two parts extend into the engine along a substantially straight line toward the center of the engine. In the stored position the part nearest the engine center during operation is folded with respect to the other part about the pivotable connection so that the reverser can be stored in a compartment shorter than the operative length of the reverser.

---

This invention relates to a thrust reverser for jet engines. More particularly, this invention relates to a segmented thrust reverser that is folded in the stored position.

Although generally useful in the field of thrust reversal, the present invention is particularly useful in ejector type exhaust nozzles such as that described in U.S. Patent No. 3,057,150. An important design factor in such an exhaust nozzle in that aerodynamic considerations limit the optimum length of the ejector. For a thrust reverser in which each reversing flap is a one piece element, there must be a section of the ejector nozzle of corresponding length to accommodate the reverser in the stored position.

In the present invention, reverser flaps are constructed in two parts, one of which folds under the other in the stored position. Thus, the ejector nozzle can be shortened by approximately the length of the folded portion of the reverser flap, with a significant saving in engine weight and a reduced overhanging moment resulting from the shorter nozzle.

Accordingly, one object of the present invention is to produce a novel and improved thrust reverser.

Another object of the present invention is to produce a novel thrust reverser which can extend into a jet engine for a desired length in the reversing position and can be folded for storage in a compartment having a shorter length than the length of the reverser in the operative position.

Still another object of the present invention is to produce a novel thrust reverser with a saving in total engine length and weight.

Still another object of the present invention is to produce a novel thrust reverser for ejector type nozzles with a saving in total engine length and weight and a reduction in overhanging moment from the ejector.

Other objects and advantages will be apparent from the following detailed description and drawings.

In the drawings:

FIG. 1 is a side elevation view of a foldable thrust reverser flap and actuating mechanism.

Figure 2:
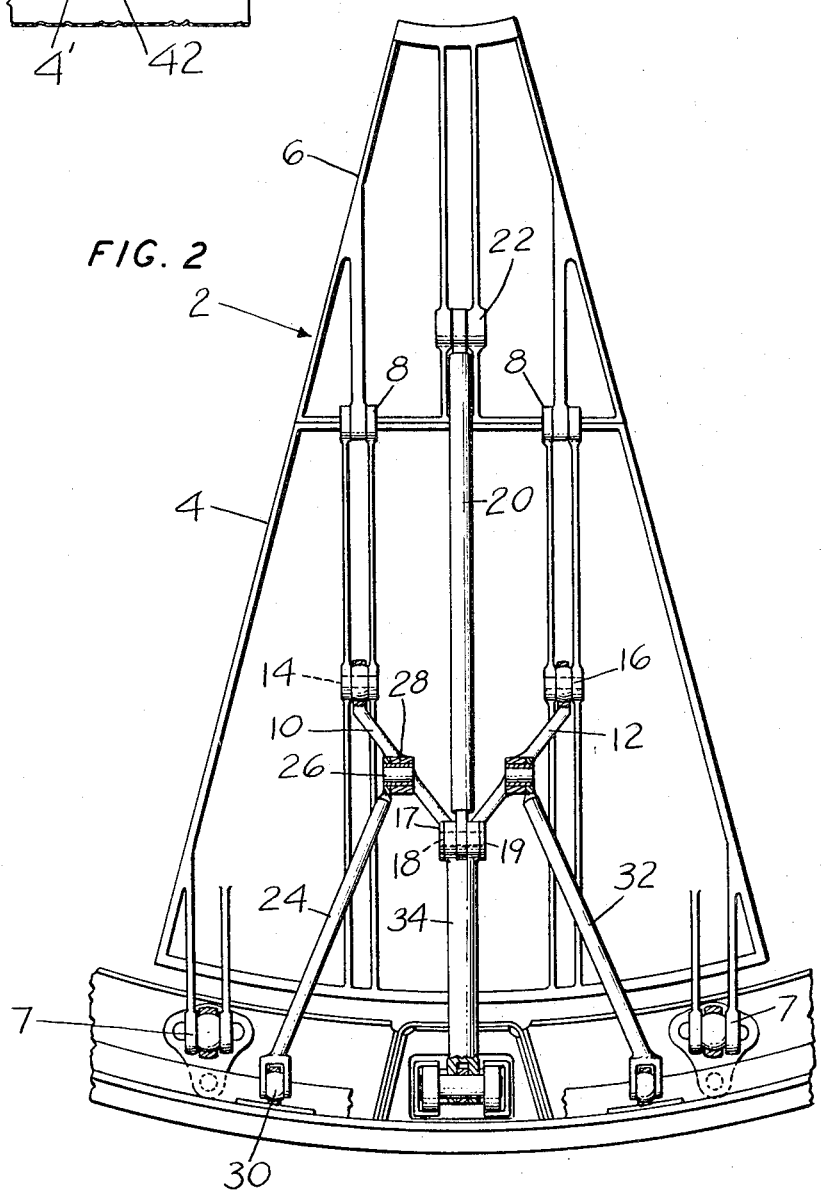
FIG. 2 is a rear elevation view of a foldable thrust reverser flap and actuator mechanism.

Referring now to FIGS. 1 and 2, a reverser flap 2 is shown in the extended position. Flap 2 is composed of plate segments 4 and 6 which are pivotably connected by pivot pins 8 so that segment 6 is pivotable with respect to segment 4. As can best be seen in FIG. 2, the sides of plate segments 4 and 6 taper inwardly with plate 6 forming an effective continuation of plate 4 in the extended position of reverser flap 2 to form a substantially unitary elongated reversing flap.

Rods 10 and 12 are each pivotally connected to plate segment 4 at spaced apart pivot points 14 and 16, respectively, and the other ends of rods 10 and 12 are joined together by pivot pin 18 passing through bosses 17 and 19 at the ends of the rods 10 and 12, respectively. Another rod 20 is also pivotably mounted on pin 18 between the bosses at the ends of rods 10 and 12, and the other end of rod 20 is pivotably connected to plate segment 6 at pivot pin 22. A rod 24 is pivotably connected at one end to rod 10 by a pin 26 at the end of rod 24 in a boss 28 carried on rod 10, and the other end of rod 24 is pivotally connected at a pivot 30 to the engine structure, referred to herein as ground. A rod 32 is similarly pivotably connected between rod 12 and ground. Another rod 34 is also pivotably connected to pin 18 between bosses 17 and 19, and the other end of rod 34 is pivotably connected by a pivot pin 36 to a driving rod 38 and a power cylinder 40.

As shown in FIGS. 1 and 2, reverser flap 2 is in the operative or thrust reversing position with the smaller end of plate segment 6 extending inward toward the center line of the engine. In this operative or reversing position, plate segment 6 extends in a substantially linear relationship from plate segment 4 to form a substantially unitary elongated reversing flap having the combined length of plate segments 4 and 6. Gas flow is from left to right in FIG. 1, and it can be seen that the actuating mechanism is shielded from the hot gases by the reverser flaps.

Referring now to FIG. 1, the letter symbols A–H indicate points in the reverser system in the operative position, and A′–H′ indicate the position of the points in the stored state. Upon receipt of an appropriate signal at power cylinder 40, driving rod 38 is moved to the left thereby causing point H to start moving toward point H′ while point F starts moving in a clockwise arc toward point F′. The movement of point F at the end of rod 34 in the clockwise arc pulls rod 20 and causes plate element 6 to pivot in a clockwise direction about pins 8 so that plate segment 6 starts to fold under plate segment 4. Simultaneously, point C, corresponding to pivot pins 8, starts to move in a clockwise arc toward point C′, point B, corresponding to pivot 14, (and also 16), starts to move in a clockwise arc toward point B′, and point E, corresponding to pin 26 (and also the pin connected to rod 12), starts to move in a counterclockwise arc toward point E′.

As plate segment 4 is moving to the stored position 4′, plate segment 6 pivots about pins 8 and folds under plate 4. Plate segment 6 completely folds under plate 4 before plate segment 4 reaches the stored position. Thus, in the stored position plate segment 6 assumes the position indicated at 6′, with point D, corresponding to pivot 22, assuming the position indicated at D′. As can best be seen in FIG. 2, the separation between rods 10 and 12 in the area of their connection to plate segment 4 is wider than the width of most of the end portion of plate segment 6. Thus, at least part of plate segment 6 fits between rods 10 and 12 as plate segments 4 and 6 move to the stored position 4' and 6'.

Figure 3:
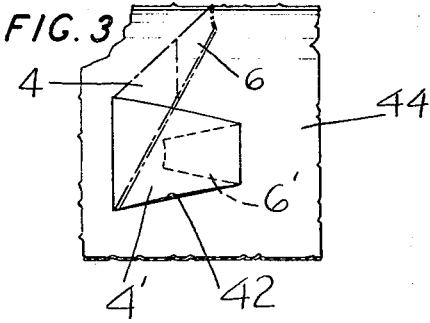
FIG. 3 is a perspective view showing the thrust reverser flap of the present invention in the stored position with a phantom showing of the reversing position.

Referring now to FIG. 3, plate segments 4 and 6 are shown in phantom in the extended or thrust reversing position in which they form a unit having a length equal to the combined length of the segments 4 and 6. When plate segments 4 and 6 are moved to the stored position as described above, they form, in effect, a package having substantially the length of plate segment 4, and the stored package fits in a compartment 42 in engine housing 44 having the length of only plate segment 4. Thus, the length of the engine can be shortened by an amount approximately equal to the length of plate segment 6, with a resulting reduction in engine weight, and also a reduction in overhang moment in the case of an ejector nozzle.

It will be understood that any desired number of reverser flaps 2 consisting of plate segments 4 and 6 can be spaced circumferentially about the engine; for the purpose of clarity of explanation, only one such reverser flap has been described herein. Also, other environmental structure, such as reverser doors to allow passage of the reversed gases to the atmosphere, has not been shown, such environmental structure being well known in the art. A blow-in door mechanism particularly suitable for use with the thrust reverser of the invention is disclosed and claimed in my copending application filed contemporaneously herewith for actuating mechanism.

In some engine installations it may be desirable to thrust reverse through only a portion of the engine circumference. To this end, reverser doors may be omitted at selected locations around the circumference of the engine. This omission of reverser doors tends to suppress the engine when the reverser flaps are actuated, and it becomes necessary to increase gas flow to avoid engine suppression. In order to spoil the forward thrust from this gas, segment 6 may have a cascade of turning vanes 46 (shown in FIG. 1 only) providing a flow path through the segment. This flow path allows passage of the gas to avoid engine suppression, and the turning vanes 46 direct the gas radially to eliminate the forward thrust component of the turned gas. In those installations where vanes 46 are used, the flow passage through segment 6 reduces the pressure differential across the segment thereby reducing the load on the mechanism.

The segmented reverser flaps can also be used to deflect the engine exhaust so that the exhaust is diverted from vulnerable objects such as people on an observation platform. A jet exhaust deflection angle of from 10° to 20° can be generated by actuating the reverser doors around any half of the engine; this deflection is equivalent to moving the exhaust jet from 17 to 36 feet per 100 feet of distance from the engine exit plane. When using the reverser flaps to accomplish this deflection, the most effective position for the plate segments is a position wherein the innermost segments 6 are not fully actuated or extended. In this manner control of the deflected stream can be accomplished by movement of segments 6 in either direction as desired.

It is to be expressly understood that the present invention is not limited to the specific embodiment illustrated and described, but may be modified or used in other ways without departing from the spirit of the following claims.

I claim:

1. A jet engine thrust reverser comprising a first reversing element pivotably mounted at one end thereof to ground, a second reversing element, means pivotably connecting said second reversing element to said first reversing element at the other end of said first reversing element, said first and second reversing elements being pivotable about substantially parallel axes and said first and second reversing elements being normally in a stored position with said second reversing element being folded with respect to said first reversing element about said pivotable connection therebetween, and means for actuating said first and second reversing elements to a thrust reversing position, said actuating means including means for pivoting said first reversing element with respect to the stored position thereof to said thrust reversing position and said actuating means further including means for pivoting said second reversing element with respect to said first reversing element during the pivoting of said first reversing element to said thrust reversing position.

2. A jet engine thrust reverser as in claim 1 wherein said second reversing element is folded under said first reversing element in said stored position, and wherein said second reversing element is extended in a substantially linear relationship with respect to said first reversing element in said reversing position to form a substantially unitary elongated reversing element.

3. A jet engine thrust reverser as in claim 2 wherein said second reversing element is substantially uniformly tapering inwardly from the end thereof connected to said first element, and wherein said actuating means includes a pair of spaced rods connected to said first reversing element, the spacing between said pair of rods being greater than the width of the tapered end of said second reversing element, the tapered end of said second reversing element fitting within the space between said pair of rods in said stored position of said first and second reversing elements.

4. A jet engine thrust reverser as in claim 1 wherein said actuating means includes first and second rods, means connecting one end of each rod together and the other end of each being spaced apart and connected to said first reversing element, and wherein said moving means includes a third rod pivotably connected to said connection between said first and second rods, said actuating means also including fourth and fifth rods each pivotably connected at one end to said first and second rods, respectively, and each pivotably connected to ground at the other end, and driving means connected to said connection between said first and second rods.

5. A thrust reverser as in claim 1 including a compartment for storing said reversing elements in said stored position, the length of said compartment being substantially equal to the length of said first reversing element.

6. A thrust reverser as in claim 1 including at least one turning vane in said second reversing element to provide a gas passage through said second reversing element in said thrust reversing position.

7. A jet engine thrust reverser comprising a first plate segment, a second plate segment, said first and second plate segments normally being in a first position with said second plate segment folded under said first plate segment to form a package having substantially the length of said first plate segment, means pivotably connecting said second plate segment to said first plate segment, first and second rods, said first and second rods being each connected at one end to said first plate segment in spaced relationship, rod connecting means connecting said first and second rods together at the other end, a third rod connected at one end to said rod connecting means and connected at the other end to said second plate segment, a fourth rod connected from said first rod to ground, a fifth rod connected from said second rod to ground, and driving means connected to said rod connecting means to drive said first and second plate segments between said first position and a second position, said second plate segment in said second position being extended from said first plate segment to form a thrust reverser element having a combined length of the lengths of said first and second plate segments.

8. A thrust reverser as in claim 7 wherein at least part of the width of said second plate segment is less than the spacing between said one ends of said first and second rods, at least part of said second plate segment being between said first and second rods in said first position of said plate segments.

9. A thrust reverser as in claim 7 including a compartment for storing said plate segments in said first position, the length of said compartment being substantially equal to the length of said first plate segment.

10. A thrust reverser as in claim 7 including at least one turning vane in said second plate segment to provide a gas passage through said second plate segment in said second position.

References Cited

FOREIGN PATENTS 1,054,849  4/1959  Germany.

EVERETT W. KIRBY, *Primary Examiner.*